(12) United States Patent
Yoshino

(10) Patent No.: US 7,911,683 B2
(45) Date of Patent: Mar. 22, 2011

(54) HARMONIC GENERATOR

(75) Inventor: Takashi Yoshino, Ama-Gun (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 12/855,111

(22) Filed: Aug. 12, 2010

(65) Prior Publication Data

US 2010/0321766 A1      Dec. 23, 2010

Related U.S. Application Data

(63) Continuation of application No. PCT/JP2009/052125, filed on Feb. 3, 2009.

(30) Foreign Application Priority Data

Feb. 19, 2008    (JP) .................................. 2008-037665

(51) Int. Cl.
    G02F 1/377      (2006.01)
    G02F 1/35       (2006.01)
    G02F 2/02       (2006.01)
(52) U.S. Cl. ........... 359/328; 359/332; 385/122; 372/22
(58) Field of Classification Search .......... 359/326–332; 372/21–22; 385/122
    See application file for complete search history.

(56) References Cited

U.S. PATENT DOCUMENTS

| 5,058,981 | A * | 10/1991 | Umegaki et al. ............. 359/328 |
| 6,317,546 | B1 * | 11/2001 | Kasazumi et al. ............ 385/122 |
| 6,882,665 | B2 * | 4/2005 | Miura et al. .................. 372/22 |
| 7,742,221 | B2 * | 6/2010 | Mizuuchi et al. ............. 359/328 |
| 2009/0180499 | A1 * | 7/2009 | Wiedmann et al. ............ 372/21 |

OTHER PUBLICATIONS

Takunori Taira et al., *"High-Power 473-nm Generation by Frequency Doubling of Nd-YAG Micro-Laser through a PPMgLN Ridge-Type Waveguide,"* Extended Abstracts, 51st Spring Meeting, 2004, The Japan Society of Applied Physics and Related Societies, No. 3, p. 1304.

Hong Ky Nguyen et al., *"107-mW Low-Noise Green Light Emission by Frequency Doubling of Reliable 1060-nm DFB Semiconductor Laser Diodes,"* IQEC/CLEO-PR 2005, Tokyo, Japan, Jul. 11-15, 2005, post deadline PDG-2.

Hong Ky Nguyen et al., *"107-mW Low-Noise Green-Light Emission by Frequency Doubling of a Reliable 1060-nm DFB Semiconductor Laser Diode,"* IEEE Photonics Technology Letters, vol. 18, No. 5, Mar. 1, 2006, pp. 682-684.

* cited by examiner

*Primary Examiner* — Daniel Petkovsek
(74) *Attorney, Agent, or Firm* — Burr & Brown

(57) ABSTRACT

A harmonic wave oscillating system includes a solid-state laser oscillator, a converting waveguide converting a wavelength of a laser light oscillated from the solid-state laser oscillator to oscillate a harmonic wave, an incident-side end face of the laser light, an emitting-side end face of the harmonic wave, a first side face and a second side face. The emitting-side end face includes a polished surface 6 formed on the side of the first side face 1a and a light scattering surface formed on the side of the second side face 1b. The first side face 1a and polished surface 6 are intersected at an obtuse angle θ, and the second side face 1b and light scattering surface 5 are intersected at an obtuse or right angle α.

4 Claims, 8 Drawing Sheets

HARMONIC GENERATOR

TECHNICAL FIELD

The present invention relates to a harmonic generator.

BACKGROUND ARTS

Across the entire gamut of technology of optical information processing, in order to realize high-density optical recording, a blue light laser stably oscillating blue light with a wavelength of approximately 400 to 430 nm at an output of 30 mW or more is required, and the development race is now on. As such blue light source, there is expected an optical waveguide-type wavelength conversion device with a combination of a laser oscillating red light as a fundamental wave and a second-harmonic-generator of a quasi-phase-matched system.

Nonlinear optical crystal such as lithium niobate or lithium tantalate single crystal has a high secondary nonlinear optical constant. When a periodic domain polarization inversion structure is formed in the above crystals, a second-harmonic-generation (SHG) device of a quasi-phase-matched (QPM) system can be realized. Further, when a waveguide is formed within this periodic domain inversion structure, the high-efficiency SHG device can be realized and further, applied to optical communication, medical science, photochemistry, various optical measurements over a wide range.

IQEC/CLEO-PR 2005, Tokyo, Japan, Jul. 11-15, 2005, post-deadline paper PDG-2 disclosed the followings. A fundamental wave from a DFB laser diode is condensed by a condenser lens, higher harmonics (green light) are obtained by irradiating the wave onto a PPLN optical waveguide device, and these higher harmonics are condensed to thereby be oscillated. The PPLN optical waveguide device is obtained by forming an optical waveguide in an MgO doped lithium niobate single crystal substrate and forming the periodic domain inversion structure within this optical waveguide. An incident-side end face and emitting-side end face of the optical waveguide device made of lithium niobate single crystal are polished so as to be largely inclined with respect to the plane perpendicular to the optical waveguide, as shown in FIG. 1(a). Thereby, the incidence of the reflected light onto a laser oscillation source is prevented.

SUMMARY OF INVENTION

According to the harmonic wave oscillating device using the lens connection system described in IQEC/CLEO-PR 2005, Tokyo, Japan, Jul. 11-15, 2005, post-deadline paper PDG-2, the incident and emitting faces of the optical waveguide substrate are polished so that the face are inclined. It is thus difficult to position the lens near the optical waveguide substrate. It is thus required to use a lens having a large size and long focal length. Since it is necessary to contain such lens of a large size in a harmonic wave oscillating system, the oscillating system cannot be miniaturized. In addition to this, as the size of the lens is large, the lens receives light radiated from a slab part of the optical waveguide substrate and scattered light, so that the quality of the light beam is deteriorated.

An object of the present invention is to miniaturize a laser oscillating source using a waveguide-type wavelength conversion device, to prevent the reflected light from the laser oscillating source to the device to stabilize the oscillation and to improve the quality of the outgoing light beam.

The present invention provides a harmonic wave oscillating system comprising:

a solid-state laser oscillator;

a waveguide-type harmonic wave oscillating device comprising a converting waveguide converting a wavelength of a laser light oscillated from the solid-state laser oscillator to oscillate a harmonic wave, an incident-side end face of the laser light, an emitting-side end face of the harmonic wave, a first side face and a second side face;

a first lens system condensing the laser light oscillated from the solid-state laser oscillator to the incident-side end face of the waveguide-type harmonic wave oscillating device; and a second lens system condensing the harmonic wave emitted from the emitting-side end face of said waveguide-type harmonic wave oscillating device;

wherein the emitting-side end face comprises a polished surface formed on the side of the first side face and a light scattering surface formed on the side of the second side face, wherein an angle $\theta$ of the first side face and polished surface is an obtuse angle, and wherein an angle $\alpha$ of the second side face and the light scattering surface is an obtuse or right angle $\alpha$.

According to the present invention, the emitting-side end face of the waveguide-type harmonic wave oscillating device includes the polished surface on the first side and the light scattering surface formed on the second side with respect to the modulating optical waveguide. The angle $\theta$ of the first side face and polished surface is an obtuse angle and the angle $\alpha$ of the second side face and light scattering surface is an obtuse or right angle. It is thereby possible to position the lens system near the light scattering surface of the device. It is thus possible to use a lens having a short focal length and a small diameter, so that the whole sizes of the optical system and the harmonic wave oscillating system can be minimized.

Further, by forming the polished surface intersected at an obtuse angle with respect to the side face, it is possible to prevent the reflected light from the incidence into the oscillating source and to stabilize the state of oscillation.

Further, by positioning the lens system near the light scattering surface on the side of the emitting-side, it is possible to prevent the beam of unnecessary slab mode emitted from the polished surface from the connection with the lens. And the emitting beam from the light scattering surface is diffused and not condensed at the lens. It is thus possible to condense only desired harmonic wave emitted from the optical waveguide efficiently and to obtain small harmonic wave beam with a low noise.

BEST MODES FOR CARRYING OUT THE INVENTION

Hereinafter, the present invention will be further described in detail.

Figures 1A, 1B:
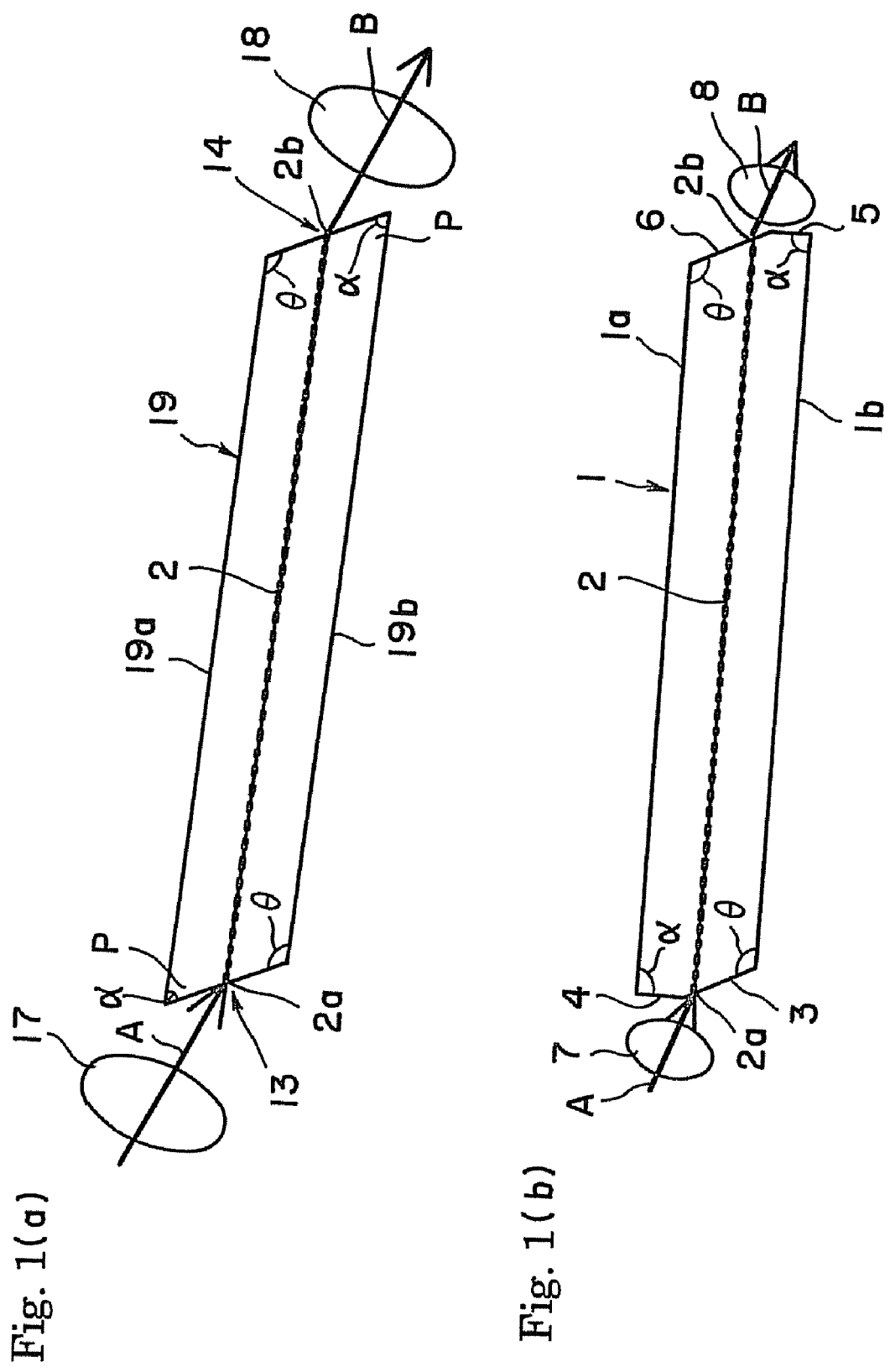
FIG. 1(a) is a view schematically showing an essential part of a system of prior art.
FIG. 1(b) is a view schematically showing an essential part of a system according to the present invention.

FIG. 1(a) is a view schematically showing an essential part of a harmonic wave oscillating system of a prior art. A waveguide-type harmonic wave oscillating device 19 has an optical waveguide 2 formed therein, and the waveguide has a function of wavelength conversion. An incident-side end face 13 and an emitting-side end face 14 of the harmonic wave oscillating device 2 are optically polished surfaces which are plane shaped. Therefore, the angle θ of the emitting face 14 and the first side face 19b is an obtuse angle, and the angle α of the emitting face 14 and second side face 19b is an acute angle. A condensing lens system 17 is provided so as to oppose the incident-side end face, and a lens system 18 is provided so as to oppose the emitting-side end face 14.

A fundamental wave is condensed at the lens system 17 as an arrow A, irradiated into the end face 2a of the optical waveguide and then subjected to wavelength conversion in the optical waveguide. A harmonic wave is emitted from an end face 2b and then condensed at the lens system 18, as an arrow B.

Figure 6:
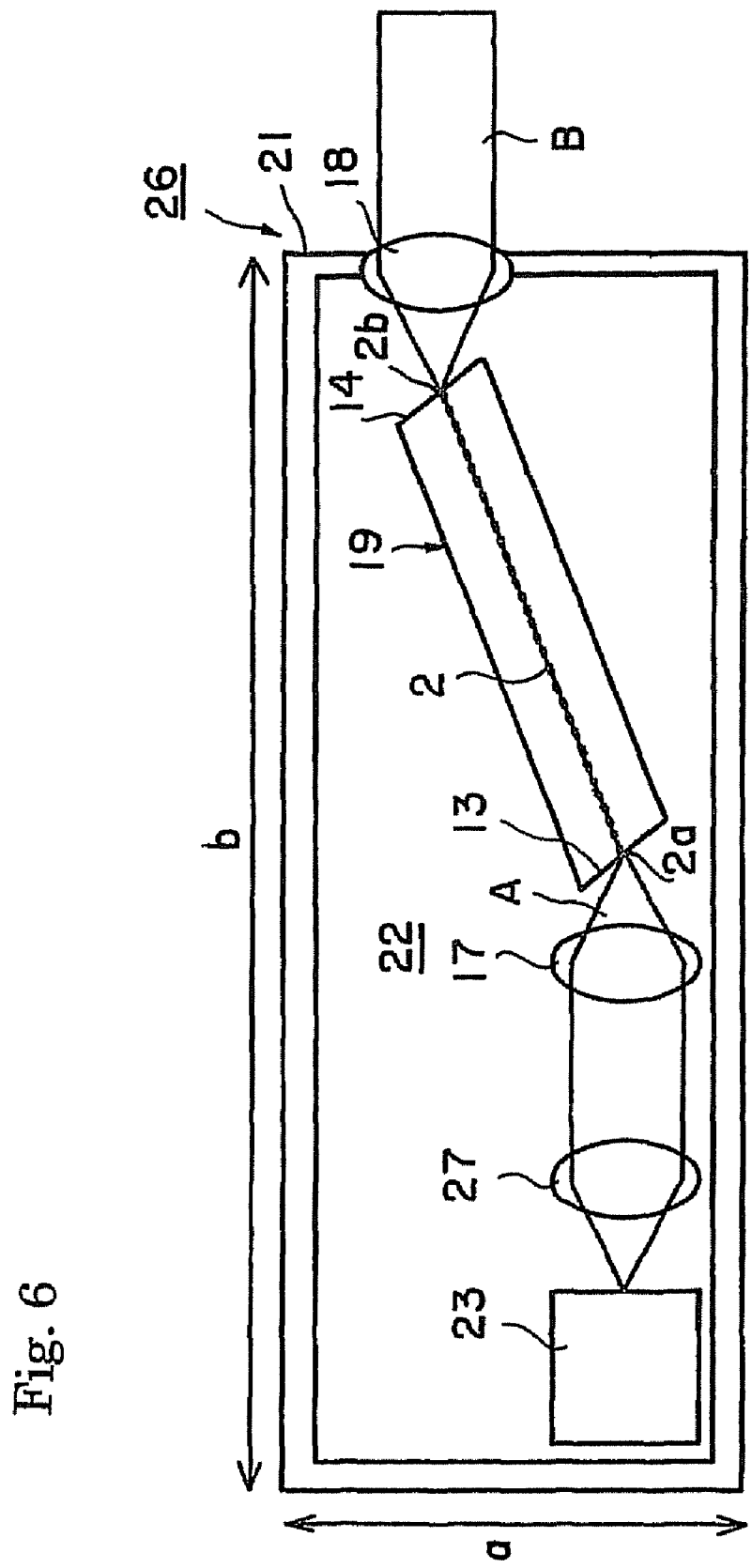
FIG. 6 is a view schematically showing an oscillating system of a prior art.

According to this example, however, a part P forming an acute angle is protruded toward the lens system in a plan view, so that it is impossible to position the lens systems 17 and 18 near the end faces 13 and 14, respectively. It is thus necessary to use the lens systems 17, 18 having large diameters. As schematically shown in FIG. 6, a solid-state laser oscillating device 23, condensing lens systems 27, 17, a waveguide-type harmonic wave oscillating device 19 and a lens system 18 are provided in a space 22 in a package 21 of an oscillating system 26. In this case, as the diameters of the lens systems 17 and 18 are large, it is difficult to miniaturize the package 21.

Figure 2:
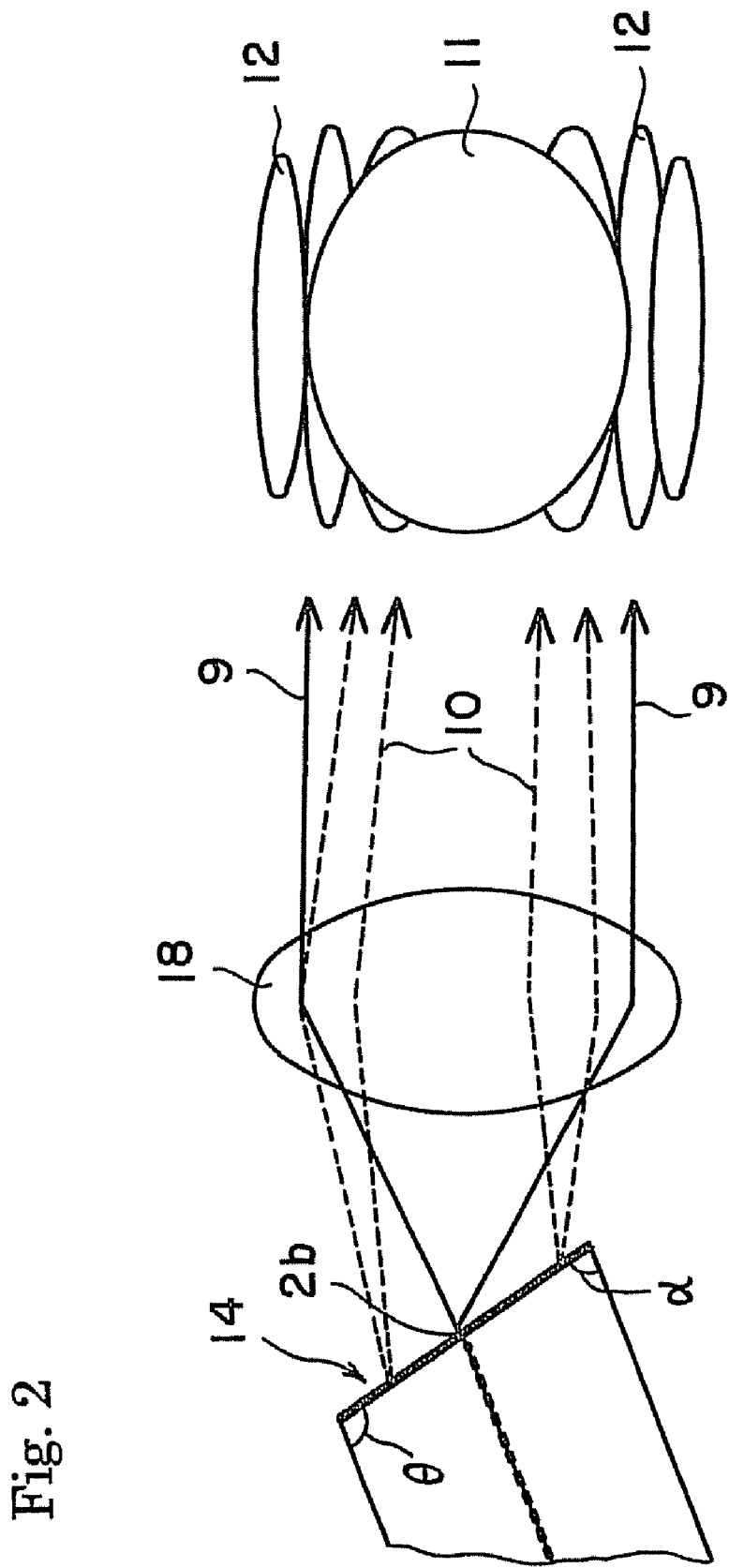
FIG. 2 is a diagram schematically showing the connection of a harmonic wave and a slab mode light in the system of a prior art.

Further, as shown in FIG. 2, desired harmonic wave 9 is emitted from the emitting-side end face 14, condensed at the lens system 18 and then oscillated as 11. As the diameter of the lens 18 is large, however, unnecessary emitting light 10 of slab mode is emitted from the emitting-side end face 14 at the same time, condensed at the lens 18 and then oscillated as 12. As the unnecessary light 10 of slab mode is superimposed, small beam of harmonic wave cannot be obtained and the noise in the harmonic wave beam is increased.

On the contrary, according to the inventive example, as shown in FIG. 1(b), the emitting-side end face of the device 1 includes a polished surface 6 formed on the side of the first side face 1a and a light scattering surface 5 formed on the side of second side face 1b with respect to the converting optical waveguide 2. Then, the angle θ of the first side face 1a and the polished surface 6 is an obtuse angle as FIG. 1(a). However, the angle α of the second side face 1b and the light scattering surface 5 is not an acute angle but an obtuse or right angle.

Further, as shown in FIG. 1(b), the incident-side end face of the device 1 includes a polished surface 3 formed on the side of the second end face 1b and a light scattering surface 4 formed on the side of the first side face 1a with respect to the optical waveguide 2. Then, the angle θ of the second side face 1b and the polished surface 3 is an obtuse angle as FIG. 1(a). However, the angle α of the first side face 1a and the light scattering surface 4 is not an acute angle but an obtuse or right angle.

Figure 3:
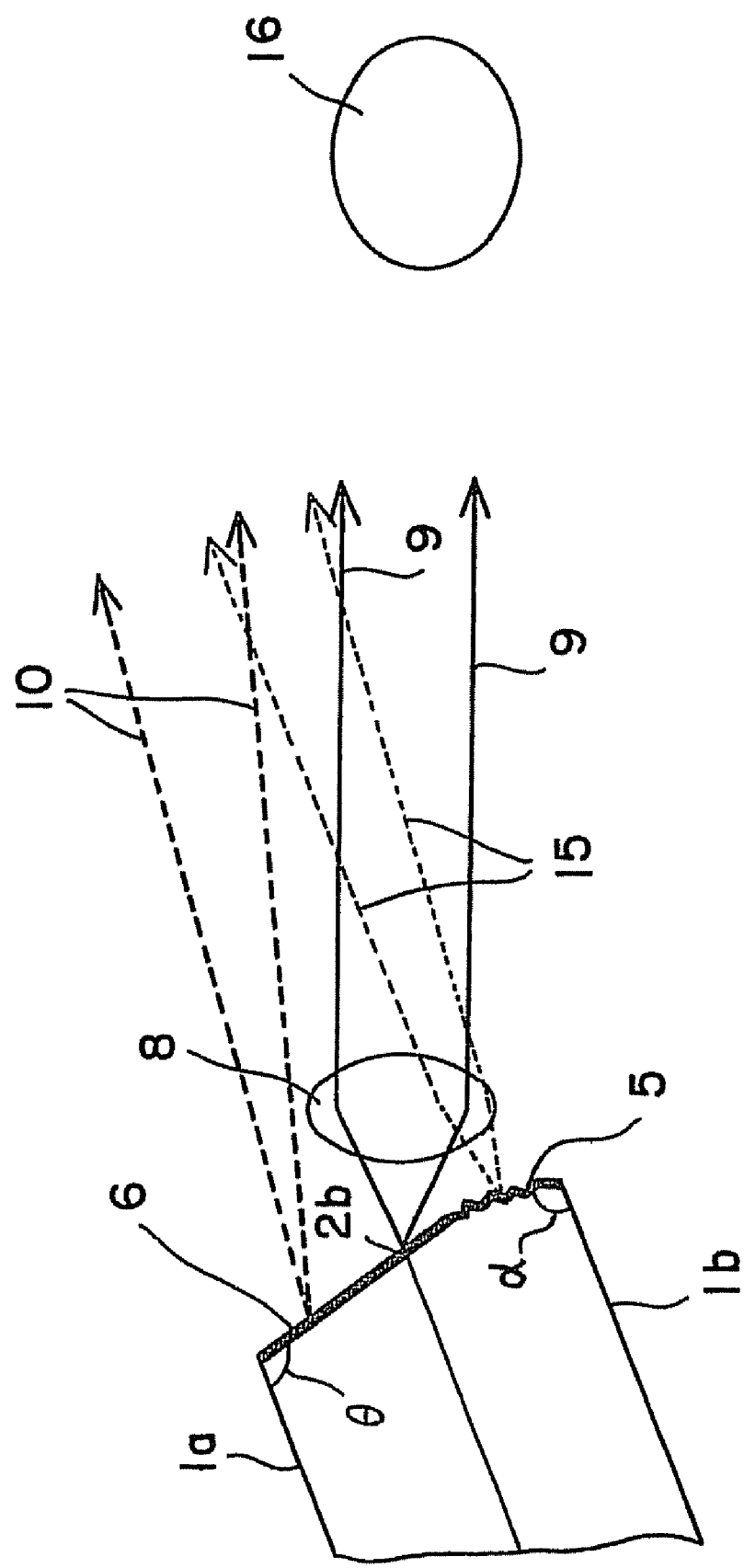
FIG. 3 is a diagram schematically showing the connection of a harmonic wave and a slab mode light in the system of the present invention.
Figure 5:
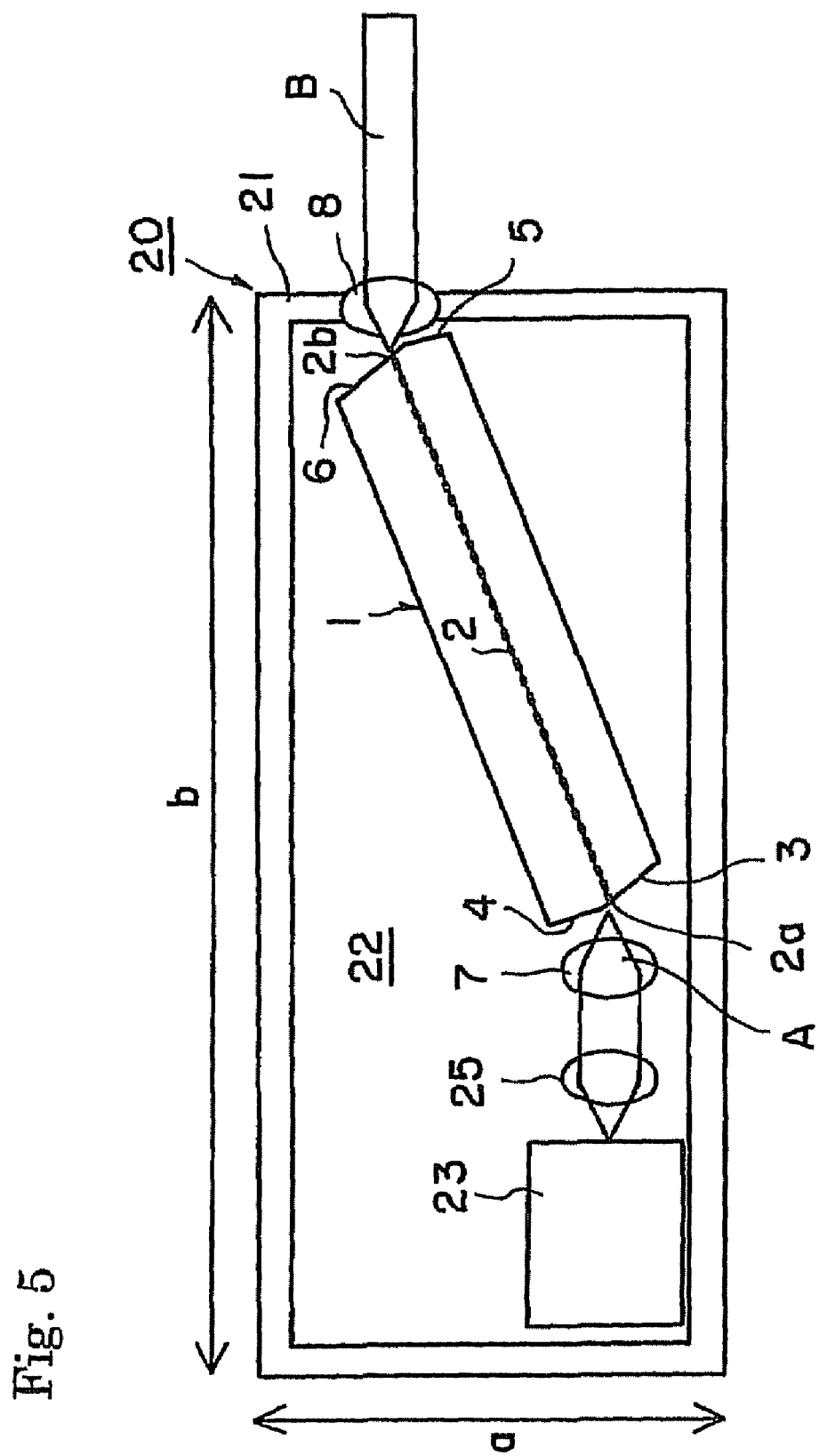
FIG. 5 is a view schematically showing an oscillating system of the present invention.

According to the present example, the part P forming an acute angle is not provided, and as shown in FIGS. 3 and 5, the light scattering surfaces 4 and 5 intersect the side faces at an obtuse or right angle, respectively. It is thereby possible to position the lens systems 7 and 8 near the light scattering surfaces, respectively, and to minimize the diameter of the lens system. As a result, as schematically shown in FIG. 5, when a solid-state laser oscillating device 23, condensing lens systems 25, 7, a waveguide-type harmonic wave oscillating device 1 and a lens system 8 are contained in a space 22 in a package 21 of an oscillating system 20, the diameters of the lens systems 7, 8 can be reduced and the package 21 can be miniaturized.

Further, as schematically shown in FIG. 3, desired harmonic wave 9 is emitted from the end face of the optical waveguide and then condensed at the lens system 8 to oscillate as 16. Although unnecessary light 10 of slab mode is also emitted from the polished surface 6, as the diameter of the lens 8 is small, the unnecessary light is hardly condensed at the lens 8 and the noise is prevented. At the same time, light is emitted from the light scattering surface 5 near the lens. However, the light 15 is scattered and thus prevented from the connection with the lens 8 and the noise generation. As a result, small beam 16 of harmonic wave with a low noise can be obtained.

According to the present invention (see FIG. 4), at the emitting-side end face, the angle θ of the first side face 1a and the polished surface 6 is an obtuse angle. Further, at the incident-side end face, the angle θ of the second side face 1b and polished surface is an obtuse angle.

An obtuse angle is a term meaning an angle larger than 90°, as well know by skilled artisans. On the viewpoint of preventing the reflected light to the laser oscillator, θ may preferably be 93° or larger and more preferably be 98° or larger. Further, on the viewpoint of production, θ may preferably be 120° or less.

According to the present invention (see FIG. 4), at the emitting-side end face, the angle α of the second side face 1b and the light scattering surface 5 is an obtuse or right angle. Further, at the incident-side end face, the angle α of the first side face 1a and the light scattering surface is an obtuse or right angle.

An obtuse angle is a term meaning an angle larger than 90°, as well know by skilled artisans. On the viewpoint of positioning the lens systems near the incident and emitting faces, respectively, α may be right angle and may preferably be 93° or larger. On the viewpoint of production, α may preferably be 120° or less.

According to the present invention, the width W of the waveguide-type harmonic wave oscillating device is not limited. However, on the viewpoint of handling strength of the device, the width W may preferably be 0.5 mm or larger.

Figure 4:
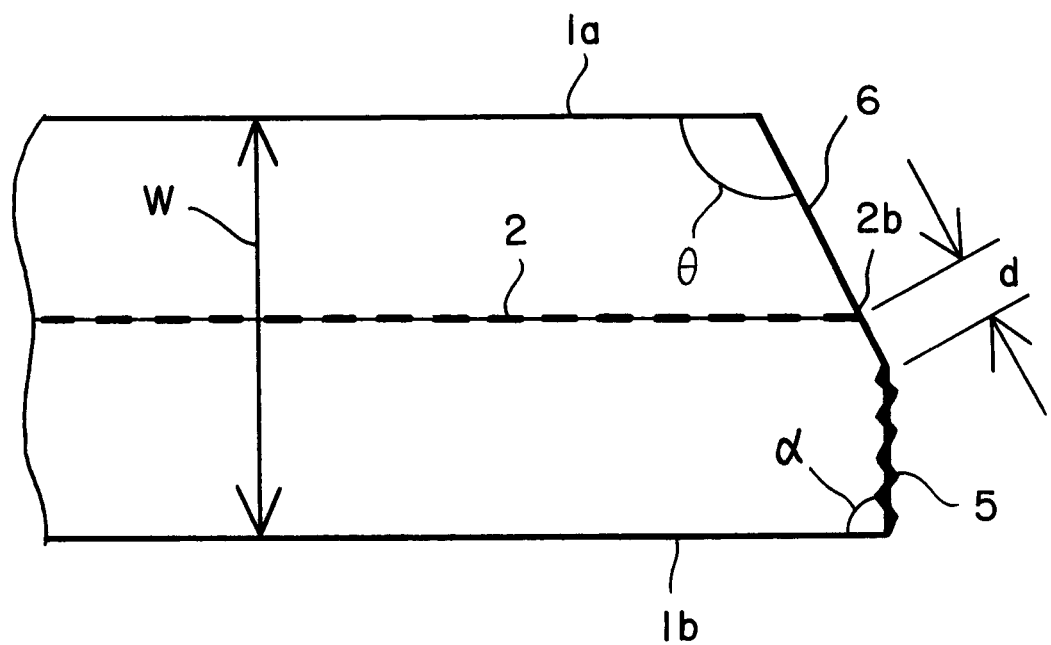
FIG. 4 is a diagram showing an end face of emitting-side of a waveguide-type harmonic wave oscillating device according to the present invention.

According to the present invention, one of the polished surface and light scattering surface is provided on the side of the first side face and the other is provided on the side of the second side face. The boundary of the polished surface and light scattering surface may be provided at the end face of the optical waveguide. According to a preferred embodiment, however, as shown in FIG. 4, the polished surface 6 (3) is extended from the end face 2b (2a) of the optical waveguide toward the light scattering surface 5 (4) by a dimension "d". Although the dimension "d" is not limited, it may preferably be 0.05 mm or larger, on the viewpoint of preventing the reflected light from the end face of the optical waveguide 2.

According to the present invention, although Ra of the polished surface is not limited, it may preferably be 5 nm or smaller and more preferably be 2 nm or smaller, on the viewpoint of improving the efficiency of harmonic wave oscillated from the optical waveguide and to prevent the scattering. Further, a method of polishing is not limited and may preferably be mechano-chemical polishing.

According to the present invention, Ra of the light scattering surface may preferably be 10 nm or larger on the viewpoint of efficiently scattering light. The light scattering surface may be, for example, an as-cut face formed by cutting a device without the subsequent polishing. Further, although it is possible to polish or grind the as-cut face, it is necessary that Ra is not lowered to that of optical polishing after the processing.

According to a preferred embodiment, the waveguide-type harmonic wave oscillating device is a ridge-type wavelength converting device having a waveguide protruding from a joining layer or substrate. Such device is combined with the laser light source so that the driving voltage and heating value can be considerably reduced.

According to a preferred embodiment, the three-dimensional optical waveguide is a ridge type waveguide which is obtained by physically processing, for example machining or laser processing, and shaping a non-linear optical crystal. Then, the three-dimensional optical waveguide is joined to a substrate through a joining layer made of a non-crystalline material.

Figure 7:
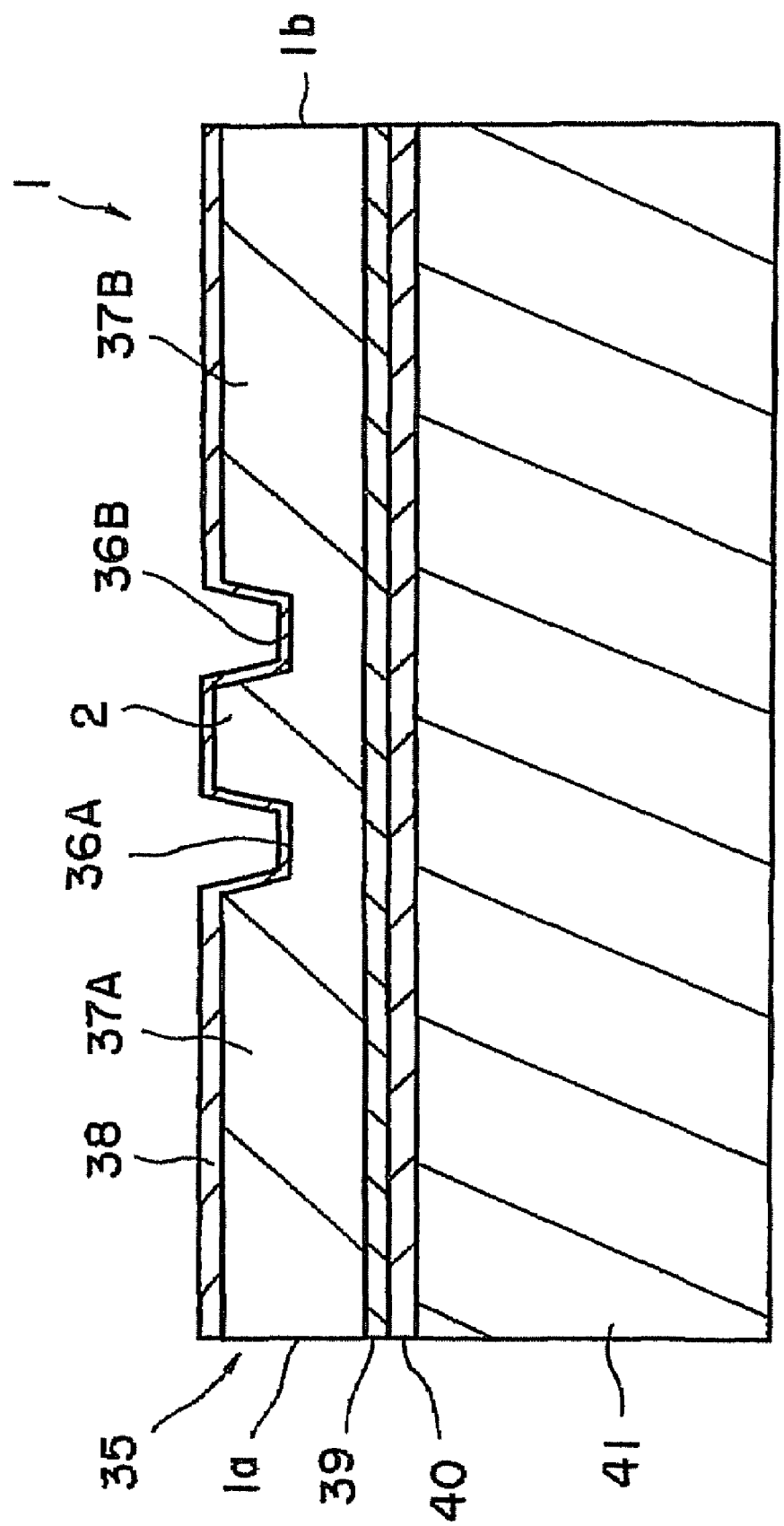
FIG. 7 is a cross sectional view showing an essential part of the waveguide-type harmonic wave oscillating device 1 usable for the present invention.

FIG. 7 is a cross sectional view schematically showing a waveguide-type harmonic wave oscillating device 1 usable in an embodiment of the present invention.

A ferroelectric layer 35 includes a ridge type optical waveguide 2 having a function of wavelength conversion, groove-forming parts 36A, 36B provided on both sides of the wavelength converting part 2, and extended parts 37A, 37B provided outside of the respective groove-forming parts. A surface side-buffer layer 38 is formed on a surface and a back-side buffer layer 39 is formed on the back face of the ferroelectric layer 35. The ferroelectric layer 35 is joined to a supporting body 41 through the buffer layer 39 and a joining layer 40. Besides, the back face of the ferroelectric layer means a main face joined to the supporting body and the surface means a main face on the opposite side of the back face.

A means of converting wavelength in the optical waveguide is not particularly limited. According to a preferred embodiment, a periodic domain inversion structure is formed in the optical waveguide to convert the wavelength of a fundamental wave to output a harmonic wave. The period of such domain inversion structure is changed depending on the wavelength. Further, although a method of forming the domain inversion structure is particularly limited, electric poling method is preferred.

Alternatively, a non-linear optical crystal, such as potassium lithium niobate, potassium lithium tantalate or solid solution of potassium lithium niobate and potassium lithium tantalate, may be used to convert the wavelength of the incident fundamental wave to that of the harmonic wave.

Although materials for the ferroelectric layer is not particularly limited as far as it is capable of modulating light; lithium niobate, lithium tantalate, lithium niobate-lithium tantalate solid solution, potassium lithium niobate, KTP, GaAs, quartz and the like are exemplified.

For further improving the resistance of the optical waveguide against optical damage, the ferroelectric single crystal includes one or more metal elements selected from the group consisting of magnesium (Mg), zinc (Zn), scandium (Sc), and Indium (In), and magnesium is most preferred. The ferroelectric single crystal may include a rare earth element as a dopant. The rare earth element functions as an additional element for laser oscillation. The rare earth element may preferably be Nd, Er, Tm, Ho, Dy or Pr.

The materials of the surface-side and back-side buffer layers include silicon oxide, magnesium fluoride, silicon nitride, alumina and tantalum pentoxide.

The material of the adhesive layer may be an inorganic adhesive, an organic adhesive or a combination of inorganic and organic adhesives.

Specific examples of the material of the supporting substrate 41 are not particularly limited, but include lithium niobate, lithium tantalate, a glass such as quartz glass, quartz, Si or the like. In this case, from the viewpoint of difference of thermal expansion coefficients, the materials of the ferroelectric layer and the supporting substrate may preferably be the same, and lithium niobate single crystal is particularly preferred.

EXAMPLES

Inventive Example

The oscillating system described referring to FIGS. 1(b), 3, 5 and 7 was produced.

Specifically, a comb-shaped periodic electrode having a period of 4.20 μm was provided on a 5° off-cut Y substrate made of MgO 5% doped lithium niobate and having a thickness of 0.5 mm by photolithography. An electrode film was formed on the whole surface of the back face of the substrate, and pulse voltage was applied thereon to form a periodic domain inversion structure.

After the periodic domain inversion structure was formed in the substrate, an under clad 39 of $SiO_2$ having a thickness of 0.4 μm was formed thereon by sputtering. An adhesive was applied on a substrate 41 of a non-doped lithium niobate substrate having a thickness of 0.5 mm, which was then adhered to the MgO-doped lithium niobate substrate. The surface of the MgO-doped lithium niobate substrate was ground and polished to a thickness of 3.6 μm. Then, the ridge-type optical waveguide 2 was formed by laser ablation.

Figure 8:
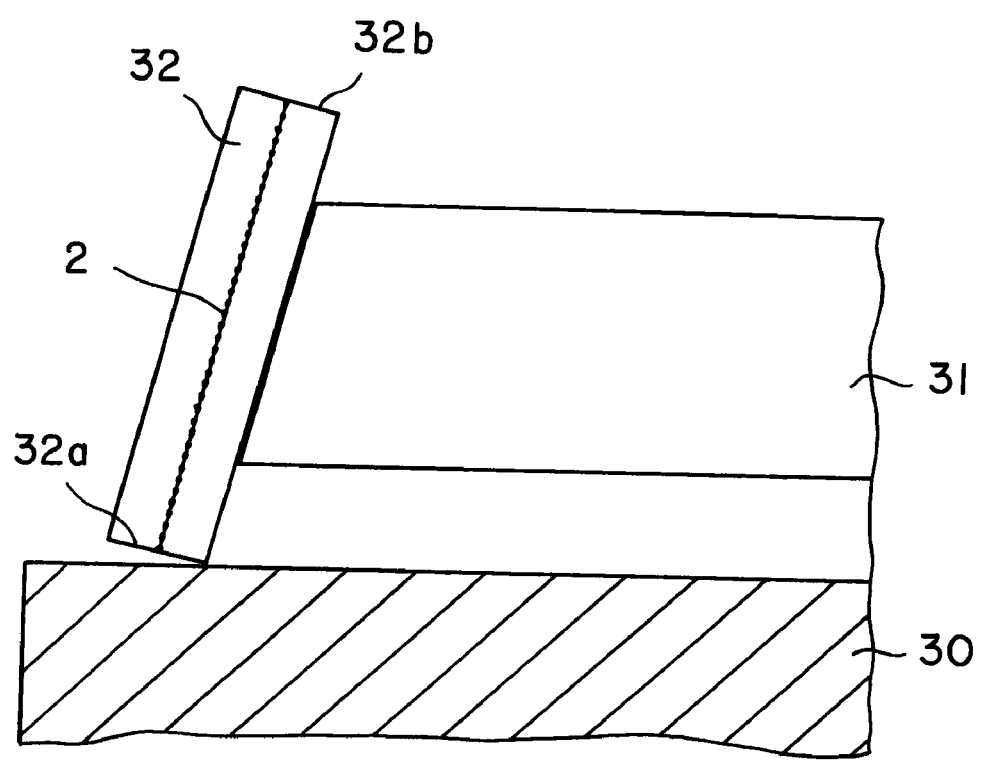
FIG. 8 is a view schematically illustrating a method of forming an end face of the device according to the present invention.

After the optical waveguide 2 was formed, the device was cut with a dicer to a length of 9 mm and a width of 1.0 mm to obtain a device 32 shown in FIG. 8. The device was set on a surface plate 30 and a jig 31 as shown in FIG. 8 and both end faces 32a and 32b were polished to form polished surfaces. Anti-reflection coatings were formed on the both end faces, respectively.

After the semiconductor laser 23 and optical waveguide device 1 were mounted in the package 21 as shown in FIG. 5, the lenses 25, 7 and 8 were subjected to optical axis alignment and fixation with a resin. The lenses had an effective opening diameter of 0.6 mm and NA of 0.55. "a" and "b" could be adjusted to 7 mm and 18 mm, respectively. The oscillating power of the semiconductor laser 23 was adjusted to 350 mW, so that 260 mW could be connected to the optical waveguide 2.

The second harmonic wave with the maximum output power of 142 mW could be obtained when the wavelength of the semiconductor laser 23 was adjusted by temperature adjusting at the phase matching wavelength. At that time, the wavelength of the fundamental wave was 919.7 nm. The beam size of 0.5 mm ($1/e^2$) of the emitting second harmonic wave could be obtained. Further, the M2 value of the emitted second harmonic wave was measured with a beam profiler to obtain a value of 1.08, indicating good beam quality. M2 value is 1.0 in the case of ideal Gaussian beam. As the profile of the beam is deformed, the value become larger.

Comparative Example

The harmonic wave oscillator having a construction shown in FIGS. 1(a), 2, 6 and 7 was produced.

Specifically, the waveguide-type harmonic wave oscillator having the construction shown in FIG. 7 was produced according to the same procedure as the Inventive Example. After the device 32 was cut with a dicer to a length of 9 mm and a width of 1.0 mm, the device was then set on a surface plate 30 and a jig 31 as shown in FIG. 8 and both end faces 32a and 32b were polished. After the polishing of the end faces, anti-reflection coatings were formed on the end faces.

After the semiconductor laser 23 and optical waveguide device 19 were mounted in the package 21 as shown in FIG. 6, the lenses 27, 17 and 18 were subjected to optical axis alignment and fixation with a resin. The lenses had an effective opening diameter of 2.0 mm and NA of 0.55. "a" and "b" could be adjusted to 10 mm and 26 mm, respectively.

The oscillating power of the semiconductor laser 23 was adjusted at 350 mW, so that 260 mW could be connected to the optical waveguide 2. The second harmonic wave with the maximum output power of 142 mW could be obtained when the wavelength of the semiconductor laser was adjusted by temperature adjusting at the phase matching wavelength. At that time, the wavelength of the fundamental wave was 919.7 nm. The beam size and M2 value of the emitting second harmonic wave was 1.9 mm ($1/e^2$) and 1.21, respectively.

Although specific embodiments of the present invention have been described above, the present invention is not limited to the specific embodiments and may be performed with various modification and changes without departing from the attached claims.

The invention claimed is:

1. A harmonic wave oscillating system comprising:
   a solid-state laser oscillator;
   a waveguide-type harmonic wave oscillating device comprising a converting optical waveguide converting a wavelength of a laser light oscillated from said solid-state laser oscillator to oscillate a harmonic wave, an incident-side end face of said laser light, an emitting-side end face of said harmonic wave, a first side face and a second side face;
   a first lens system condensing said laser light oscillated from said solid-state laser oscillator to said incident-side end face of said waveguide-type harmonic wave oscillating device; and
   a second lens system condensing said harmonic wave emitted from said emitting-side end face of said waveguide-type harmonic wave oscillating device;
   wherein said emitting-side end face comprises a polished surface formed on the side of said first side face and a light scattering surface formed on the side of said second side face,
   wherein an angle θ of said first side face and said polished surface is an obtuse angle, and
   wherein an angle α of said second side face and said light scattering surface is an obtuse or right angle.

2. The harmonic wave oscillating system of claim 1, wherein said incident-side end face comprises a polished surface formed on the side of said second side face and a light scattering surface formed on the side of said first side face, wherein an angle θ of said second side face and said polished surface is an obtuse angle, and an angle α of said first side face and said light scattering surface is an obtuse or right angle.

3. The harmonic wave oscillating system of claim 2, wherein said converting optical waveguide comprises a ridge-type optical waveguide.

4. The harmonic wave oscillating system of claim 1, wherein said converting optical waveguide comprises a ridge-type optical waveguide.

* * * * *